Patented Jan. 18, 1938

2,105,503

UNITED STATES PATENT OFFICE 2,105,503

PIGMENT MANUFACTURE

Harold Robert Rafton, Andover, Mass., assignor to Raffold Process Corporation, a corporation of Massachusetts No Drawing. Application January 26, 1932, Serial No. 589,046

4 Claims. (Cl. 134—58)

My invention relates to pigment and the manufacture thereof.

The principal object of my invention is the manufacture of pigment having the composition of calcium carbonate magnesium hydroxide.

A further object is the manufacture of pigment having the composition of calcium carbonate magnesium basic carbonate.

A further object is the manufacture of pigment comprising calcium carbonate magnesium hydroxide wherein the calcium content of a lime containing magnesia is partially carbonated with an alkali metal carbonate and partially with carbon dioxide.

A further object is the manufacture of pigment comprising calcium carbonate magnesium basic carbonate wherein the calcium content of a lime containing magnesia is partially carbonated with an alkali metal carbonate, and the remainder of the calcium content and the magnesium content is carbonated with carbon dioxide.

A further object is the manufacture of pigment having the composition of calcium carbonate magnesium basic carbonate, which pigment imparts a higher opacity and better finish to paper when used therein than calcium carbonate magnesium basic carbonate previously made.

A further object is the manufacture of calcium carbonate magnesium basic carbonate of a definite composition.

A further object is the manufacture of calcium carbonate magnesium basic carbonate substantially free from long, needle-like, or feathery crystals.

A further object is the manufacture of calcium carbonate magnesium hydroxide and/or calcium carbonate magnesium basic carbonate by a simple and economical process.

Other objects and advantages of my invention will become apparent during the course of the following description.

In my Patent No. 1,595,416 issued August 10, 1926, I disclose paper filled with calcium carbonate magnesium basic carbonate and also a paper coated with calcium carbonate magnesium basic carbonate.

I describe in that patent a method of producing calcium carbonate magnesium basic carbonate by treating a lime containing magnesia with carbon dioxide (page 2, lines 29—101 inclusive).

In the above described method the calcium carbonate magnesium basic carbonate may be produced from a lime containing magnesia preferably by slaking the lime thoroughly in water and then subjecting it to carbon dioxide in excess of the amount required to satisfy the calcium. One modification of the material (which I may call modification A) is produced by allowing sufficient carbon dioxide to react up to the point where, for example with a dolomitic lime, i. e. a lime containing approximately equimolecular porportions of calcium and magesium, the calcium would just begin to dissolve as bicarbonate. It may be that the dolomitic lime contains practically the highest precentage of magnesia of any lime containing magnesia commercially available. When such a reaction is carried out under pressure at a suitable concentration, about two-thirds of the magnesium can be dissolved before the calcium begins to go into solution. A convenient method of carrying out this reaction is stated to be in the cold under pressure. The undissolved material has the desired composition of calcium carbonate magnesium basic carbonate, and is the above referred to modification A. This modification, thus, contains less magnesium in proportion to the calcium than there was in the original lime used as starting material.

If desired, the magnesium containing liquid may be treated for the recovery of the dissolved magnesium, and the recovered magnesium compound subsequently mixed with the above mentioned undissolved material, giving what I may term modification B1; or the recovery of the dissolved magnesium may take place in the presence of the undissolved matter, giving modification B2. In either case the material produced contains a mixture of the original undissolved material and the magnesium material precipitated from its solution, the composite material being very similar in the two cases, and thus they may both be grouped as modification B.

A further alternative procedure is to continue the addition of carbon dioxide after the calcium begins to be dissolved and subsequently recover the entire calcium and magnesium from solution or in addition to any which may remain undissolved, by removal of the carbon dioxide which is holding them in solution. The material so obtained I may term modification C. It will be noted that modifications B and C contain substantially the same proportion of calcium to magnesium as did the lime from which they were made.

I have found that if modification A be made from lime in moderately dilute aqueous suspension, e. g. approximately 5%, more or less, a material may be produced which is finely divided, and substantially all of whose particles appear to be of fine point-like shape under the microscope. I may term this modification A1.

Under other conditions, such particularly as when the aqueous lime suspension is considerably more concentrated, I have found that there may also be seen under the microscope, in addition to the point-like particles, a certain amount of crystalline material either long or needle-like, or of somewhat feathery shape, which is probably a compound of magnesium precipitated from solution. These crystals are, of course, very finely divided from the standpoint of examination by macroscopic means and also when viewed under the microscope, but when viewed under the higher powers they are readily distinguished from the point-like particles. I may term this modification A2.

Modifications B and C, when viewed under the microscope, are somewhat like modification A2, with the exception however that modifications B and C have a great deal more of the needle shape or feathery crystals present.

It will be noted that of the various calcium carbonate magnesium basic carbonates made by the several procedures above, only modification A1 possesses the point-like microscopic structure, and this structure is thus obtained only when the calcium carbonate magnesium basic carbonate contains less magnesium in proportion to the calcium than is contained in the original lime. As, in the illustrative example of the manufacture of modification A1 given above, approximately two-thirds of the original lime used has been dissolved out, the calcium and magnesium radicles are thus present in modification A1 in the molecular proportions of substantially three to one.

I have found that by conducting the manufacture of calcium carbonate magnesium basic carbonate in a somewhat different manner from either of the illustrative procedures referred to, I can produce a calcium carbonate magnesium basic carbonate which, although it contains substantially the same proportion of magnesium to calcium as obtains in the lime containing magnesia originally employed, nevertheless contains substantially no needle or feathery shaped crystals, substantially all of the particles being of point-like shape.

I have found that this material differs in microscopic structure from the calcium carbonate magnesium basic carbonate made, as disclosed in my cited prior patent, from a solution of calcium and magnesium salts and soluble carbonates or carbonates and hydroxides, as the particles of the former material although microscopically minute, either do not have the point-like structure of my new modification, or possess needle-like crystals, or both.

Moreover, my new modification possesses other characteristics distinct from the calcium carbonate magnesium basic carbonate produced by either of the illustrative procedures referred to. It also produces filled and coated papers of characteristics distinct from the papers made from the calcium carbonate magnesium basic carbonate produced by the procedures above referred to. Moreover, the method of manufacture of such material is in some respects considerably simpler than the manufacture of material by any of the above quoted adaptations of the former method, and the equipment required for the production of the material is in some respects considerably simplified.

In my former patent, in that procedure whereIn lime was subjected to the action of carbon dioxide, I stressed the desirability of performing the reaction under conditions favoring the absorption of carbon dioxide, that is, under conditions favoring the formation of magnesium bicarbonate. Thus, I recommend carrying out the reaction in the cold and under pressure. In my new method, on the contrary, I carry out the reaction under conditions which are unfavorable to the formation of magnesium bicarbonate, namely, at a high temperature and preferably without pressure substantially above atmospheric. While reduced pressure would be still more suitable, however owing to complexity in the equipment caused thereby, pressure substantially that of the atmosphere is more conveniently and economically employed. Under these conditions of high temperature, and pressure substantially atmospheric, I find that substantially no magnesium bicarbonate solution is formed. The calcium carbonate magnesium basic carbonate obtained as the reaction product contains no, or substantially no, long, needle-shaped or feathery crystals, but appears to be a magma of homogeneous finely divided particles of point-like shape.

The microscopic appearance of this material is not essentially different from the microscopic appearance of modification A1 but nevertheless the material has characteristics of increased opacity and the capability of taking a higher finish distinct from this former material, and imparts distinct technical differences to the papers manufactured therewith. This may be due to the somewhat different basic compound which may comprise the basic magnesium carbonate which is formed by my new method and probably also to the proportionately greater magnesium compound content of my new material.

The new material differs markedly, however, in microscopic appearance from modification A2 and particularly from modifications B and C, as well as from the modifications produced from the precipitation of soluble salts (as indicated above), and gives distinct technical differences in the papers manufactured therewith, notably a higher opacity and an improved finish.

I have stated above that in the manufacture of my material, I prefer to carry out the reaction at substantially atmospheric pressure. Temperature, however, is the important condition to be observed in making my new material, the matter of pressure playing a secondary role. My material can in fact be produced at pressures greatly in excess of atmospheric, but under such circumstances, in order substantially to avoid the formation of crystals other than point-like in shape, the necessity for careful temperature control is greater than at atmospheric pressure. It is necessary under such conditions to minimize as much as possible the solubility of the carbon dioxide in the water in which the lime suspension is held, and this is best done by keeping the temperature as near to boiling as possible. On the other hand, where substantially atmospheric pressure is used, or even subatmospheric pressure, a reasonable latitude in the temperature can be observed. As a matter of fact, I have found that at substantially atmospheric pressure the temperature of the reaction may be as low as approximately 60° C. (and at subatmospheric pressure somewhat lower) without the production of substantially any needle or feathery shaped crystals in my material. However, there is a small amount of magnesium which goes into solution under these conditions and thus the material produced, although of proper crystalline structure, will be somewhat inferior because of a slightly decreased content of magnesium. Moreover apart from this detriment there is the disadvantage of handling material suspended in a magnesium containing liquid, particularly if it is desired to subject the material to vacuum filtration, in which case the deposition of the material from solution causes considerable trouble by blinding the filter cloths. Thus, although as stated above a somewhat inferior grade of my material may be made at somewhat lower temperatures, I prefer to carry out the reaction at a temperature as near boiling as feasible.

If, however, the reaction be carried out so that a magnesium containing liquid such as magnesium bicarbonate be produced, the magnesium can be precipitated from its bicarbonate solution either in contact with the calcium carbonate magnesium basic carbonate or apart therefrom, by any means tending to remove carbon dioxide from a liquid, such as boiling, or reduced pressure, but these methods are not preferred owing to contamination of the material with needle-shape crystals, or passage of another gas therethrough, or preferably by the addition of a material forming with the dissolved carbon dioxide, or the carbonate or bicarbonate ion, an insoluble material. Examples of suitable addition materials are alkaline compounds of alkaline earth metals, such as lime, preferably slaked lime containing magnesia, calcium carbonate magnesium hydroxide, or a mixture of the same with lime.

In the preferred method of making my new material I start with a lime containing magnesia. I do not restrict myself to lime of any definite magnesia content as I have found limes of various magnesia contents suitable for my purpose. Inasmuch, however, as dolomitic lime, i. e. lime which contains calcium and magnesium in approximately equimolecular proportions, is a common and inexpensive form of lime containing magnesia, and inasmuch as a high percentage of magnesia seems to enhance the quality of my material, that type of lime is a preferred type to use in my process.

I preferably thoroughly slake the dolomitic lime with water, preferably hot water, and particularly hot water which is boiling or nearly boiling. The most efficient slaking is obtained when the slaking is carried out thick, and I thus prefer to use a quantity of water in slaking which will result in a final slaked mass of the character of a thick mud. This quantity of water will vary with different limes used, but may readily be determined by experiment. I prefer to agitate the mass during slaking and preferably to continue the agitation for some time after the slaking action has apparently ceased in order that the slaking may really be brought to a completion. Ordinarily two to three hours is a sufficient time in which to complete the slaking action. Although any suitable apparatus may be used for the slaking, I prefer to use a tank provided with an efficient agitating device.

I next preferably dilute the slaked lime with water to a consistency which may vary with conditions, but which may conveniently be in the neighborhood of 1 to 2 lbs. dry solids to the gallon. The presence of a minimum quantity of water is desirable as this is a condition which is unfavorable to the formation of magnesium bicarbonate in the reaction. However from a practical operating standpoint the quantity of water present should not be reduced too far, and should be preferably such that, after the reaction has been completed, the final reaction mix is still sufficiently liquid to flow readily and be capable of being pumped. The concentration of approximately 1 to 2 lbs. per gallon recommended above is such as to give, with most limes, a final reaction mix of a desirable low water content, but still of such a fluidity as to be capable of being pumped.

The suspension of slaked lime at approximately 1 to 2 lbs. per gallon is then preferably raised to a temperature above 60° C., preferably not below approximately 80° C., and better as near 100° C. as feasible, and at such temperature is subjected to carbon dioxide gas, preferably until no further carbon dioxide is absorbed. For purposes of this specification substantially 100° C. is taken as the boiling point, although this as will be understood will vary according to atmospheric conditions, altitude, pressure whether purposely reduced or increased as compared with atmospheric, the presence or absence of any dissolved salts in the slurry, and the like. The temperature range which may be used however will normally be within approximately 20° C. of the boiling point. The rate of absorption of the gas is high at first as no doubt the calcium reacts with the carbon dioxide until it is substantially all completely satisfied, i. e. converted to calcium carbonate, before the magnesium is substantialy acted upon. The magnesium then begins to be acted upon however and the reaction proceeds to completion, i. e. until substantially all the magnesium content of the lime is converted to magnesium basic carbonate of a definite composition as explained below, after which substantially no further carbon dioxide is absorbed. As will be apparent to one skilled in the art the time required will vary greatly with conditions of concentration, agitation, excess of gas and the like, but by adjusting these variables within economic limits I have been able to conduct the reaction in from 8 to 24 hours. I do not however limit myself to such times as they may be varied as desired according to conditions.

Inasmuch as the reaction takes an appreciable time, for the purpose of conserving gas, I prefer to carry out the reaction in a counter current manner, that is, by exposing the fresh carbon dioxide gas to the almost completely carbonated lime suspension, allowing the almost exhausted gas to come in contact with the practically uncarbonated lime. Although any suitable apparatus may be used for the gas absorption, a very convenient equipment for carrying out this reaction, providing it is desired to make the process a continuous one, is a tower provided with a plurality of horizontal compartments, into the top compartment and successively to the bottom one of which the solids in suspension flow, finally leaving from the bottom compartment of the tower; and into the bottom compartment of which carbon dioxide is introduced, and into the successively higher compartments of which it passes, until any residual gas remaining passes out of the top of the tower. The suspension is maintained in each compartment preferably at a substantial depth, conveniently one to three feet, and the gas is passed successively from the top of a lower compartment into the suspension in the next. Towers of this type of several constructions are well known to chemical engineers.

In order to assist the reaction, I prefer to provide means intimately to mix the gas with the suspension of solids in the several compartments. Suitable means for such purpose are high speed agitators, a particularly suitable type being that comprising a horizontal revolving turbine wheel attached to a vertical shaft, cooperating with a fixed peripherally arranged series of vanes. Several of these agitating devices are on the market, and I have found the type known commercially as the "Turbo-Mixer" to be satisfactory. Preferably one of these turbo-mixers is provided in each compartment of the tower, the turbine wheels being mounted on a common vertical shaft extending preferably axially of the tower, while the cooperating vanes are suitably fixed in each compartment. For most efficient gas absorption the course of the gas stream as it passes through the several compartments of the tower should be directed as nearly as possible toward the center of each successive turbine wheel.

In some cases there may be a tendency toward foam formation in one or more of the compartments, and I have found that this foam may be successfully broken down by any suitable agitating means. For example, a second turbine wheel may be employed in each compartment if desired, which wheel may be similar to the other turbine wheel used in the compartment, the second wheel being attached to the common axial shaft at a point preferably just above the surface of the liquid in the compartment. Such turbine wheels function very satisfactorily as foam eliminators, and do not need for this purpose the surrounding fixed vanes similar to those with which the other turbine wheels cooperate.

If it be desired to prepare the material on a batch basis instead of continuously, I may use instead of the tower, several tanks, preferably vertical cylindrical tanks in series, connected by gas conduits, in which tanks batches of the slaked lime suspension may be contained and into which, successively, the carbon dioxide gas may be led. The gas preferably passes through the several tanks in series, through the tank containing the most nearly carbonated material first, and through the tank containing the least carbonated last, the finished material being thus produced successively in the several tanks according to the well known counter-current principle. The tanks should preferably be provided with agitators such as turbo-mixers, and the gas should be suitably directed with respect to these mixers as described under the tower description above. Also similar foam eliminating means may be employed if necessary. If a series of tanks be used, the equipment required may sometimes be simplified if the lime be slaked first, and then diluted if desired, directly in the gas absorption tanks, as this thus eliminates the necessity of separate lime slaking tanks but it is usually not possible thus to slake lime to as heavy a slurry with agitators adapted primarily for gas absorption.

The reaction may, if desired, especially if the conservation of gas is not an important factor, be carried out as a batch process in an individual container such as a tank, without the employment of the counter-current absorption principle. In such event the gas is led into the slurry preferably at or near the bottom of a tank which may preferably be of vertical cylindrical construction. Efficient agitating means such as a turbo-mixer on a vertical shaft is provided to bring about efficient contact of gas with the liquid. A pluraltiy of turbo-mixer units may be provided in the tank, and the tank may preferably be divided with reasonably close fitting substantially horizontally disposed plates which may be cone shaped and perforated at the center, and which provide a small annular space between the tank wall and the periphery of each plate. These plates which are preferably placed between each two turbo-mixer units serve to hold the gas longer in contact with the liquid and enhance the absorption. If the lime be slaked in this tank, the entire slaking and carbonating process may thus be confined to one tank. With such an arrangement approximately 2 to 5 times the theoretical amount of carbon dioxide required may be employed.

Whether tower, tanks, or a single tank be used, it is desirable that they be suitably heat insulated, and also be provided with heating means, such for example as steam, either indirectly, for example as by pipes, or by direct admission of steam into the apparatus. With the tower, however, if a thoroughly preheated slaked lime suspension be employed, and the tower be suitably insulated, very little if any additional steam will be found to be required.

The above are merely three illustrative equipments suitable for carrying out the reaction, and of course it will be understood that not only may variations of the above be employed, but that other known equipments suitable for gas absorption, such for example as spray devices, may be used for manufacturing my material.

Although I prefer, as stated above, to carry out the slaking of the lime first, and then its carbonation, I may with a moderate degree of success start the carbonation at the same time as the slaking, or before the slaking is complete, part of the carbonation thus taking place before the completion of the slaking. This procedure has the advantage of being economical of time, but the quality of the product in certain cases does not seem to be quite so high as when the slaking is thoroughly completed before the carbonation has begun.

An operation or operations for the elimination or separation of oversize particles should be performed either on the lime, preferably after slaking, or on the material at an intermediate stage of its carbonation, or, preferably, on the finished wet material after carbonation. This may comprise such operations as the comminution of the oversize, elutriation of the material, flotation, screening, or the like, but I prefer screening followed by ultra screening. This produces a material of high quality possessing a very small quantity, if any, of particles greater than .001" in diameter.

As stated above, it is preferable to screen the finished material, because I have found that in the process of carbonation, the percentage of oversize particles present in the original raw material is reduced. Thus, a greater yield is obtained by my preferred method, as undoubtedly some of what would otherwise be oversize particles are reduced to particles of usable size by the process of carbonation.

The material obtained from the ultra screening operation may be used directly, or it may be washed or otherwise treated, and dewatered and/or dried if desired by the use of known apparatus. If the material is to be dried, the refining operation such as comminution, screening, air flotation, or the like may be practiced on the dried material rather than the screening and/or ultra material, but I prefer as stated above, to perform the refining operation on the wet material.

If it be desired to further reduce the particle size or colloidize the material, such result can be accomplished by known means such as ball mills, rod mills, or other suitable mills.

For a source of carbon dioxide, I may use pure carbon dioxide such as is derived from lime kilns or the like, or I may even use a somewhat less pure carbon dioxide mixed with nitrogen such for instance as may be derived from the burning of coke, but I have found that it is entirely satisfactory to employ ordinary boiler flue gases after suitable cleansing in a known manner. For example, flue gas may be drawn from a boiler flue, passed through a tower containing coke, preferably moistened with water, primarily to remove the mechanical impurities; or if it be desired to remove certain of the impurities like sulphur dioxide, through a tower containing limestone preferably moistened with water; and the purified gas may be used in the tower or tanks as indicated.

The final carbonated material, for example in the case where dolomitic lime has been used, has a substantially definite composition and one which I have found is reproducible even with dolomitic lime derived from two entirely different sources, such for instance as with dolomitic lime derived from the Niagara formation of Northern Ohio and with dolomitic lime derived from the Western Massachusetts dolomitic lime formation. Such dolomitic limes after treatment to saturation with carbon dioxide as herein described yield products which have a residue on ignition which equals approximately 50 to 51% of the original dry weight of the material.

Of course as will be understood, if I carry the reaction far enough to completely carbonate the calcium but not to completion as far as the conversion of all the magnesium content of the lime into magnesium basic carbonate is concerned, I obtain as the reaction product a mixture of calcium carbonate magnesium hydroxide, and calcium carbonate magnesium basic carbonate. This material will have the same general appearance under the microscope as the completely carbonated material, acts technically in paper similarly to a mixture of calcium carbonate magnesium hydroxide and calcium carbonate magnesium basic carbonate, and this method may in certain cases be a convenient method of manufacturing such a mixture. For example, the speed of absorption of the carbon dioxide appears to slow down with increase of time in certain cases with very thick slurries, and thus under certain conditions it may not be economical to carry the reaction to completion, in which case there is produced the material which is the mixture indicated above. It is to be understood, however, that in any such mixture there is present in part at least the final material which I would produce had the reaction gone to completion, and the manufacture or use of such partially completed reaction product therefore falls within the scope of my invention. However, because of the improved quality of the material produced when the reaction is carried to completion, the latter is my preferred method.

As stated above I prefer to carry out the reaction in making my product preferably at substantially atmospheric pressure. It will be understood however, that the carbon dioxide gas used will necessarily have to be under sufficient pressure to overcome frictional resistance in conduits and gas cleaning apparatus and also the static head of the suspension in the several tower compartments, in the tank, or in the series of tanks, whichever be used. Thus, in case the apparatus used comprises a tower or series of tanks, the several lower compartments of the tower, as well as all but the last of the series of tanks, may be under sufficient pressure to force the gas through the entire system. Providing the temperature be kept sufficiently high, such increase in pressure is of minor significance as previously set forth above.

For the purpose of providing the gas with the necessary pressure, I prefer to use a gas blower or pump located preferably in the conduit leading from the main flue but before the gas cleansing tower or towers. By means of this blower the gas is given sufficient pressure in slight excess of atmospheric to force it through the gas cleaning system and also through the tower or tanks containing the solid suspension to be treated.

As will be understood, it is possible to reverse this procedure and suck the gas through the entire equipment instead of forcing it, in which case, of course, a suction pump or fan may be attached to the gas outlet of the tower or tanks, but such a procedure has the disadvantage that air is drawn through any leaks in the system, which dilutes the gas, and for this reason I prefer the pressure system indicated above.

It will be apparent that if the gas containing carbon dioxide used in this process be derived from the combustion in the air of carbonaceous matter, such for example as coal, coke, oil, combustible gas, or the like, and the absorption be carried out efficiently so that substantially all of the carbon dioxide content of the gas be absorbed, the residual gas issuing from the absorption apparatus, such as the tower, tanks or the like, will be substantially pure nitrogen, or nitrogen containing but a minor percentage of oxygen.

It is thus apparent that as a by-product or a co-product of my process there may thus be produced a substantially pure nitrogen, or a nitrogen mixed with but a minor quantity of oxygen, and such nitrogen is particularly suitable for use in the synthesis of nitrogenous compounds, such for example as in the synthesis of ammonia. This nitrogen may be used directly from my process, or further purified if desired, or it may be used under pressure or liquefied if desired, and it thus becomes a very cheap source of nitrogen for further use. It is thus apparent that the process of manufacturing my material may be described as a combined process for the manufacture of a pigment and nitrogen.

As I have described my process above, I preferably start with a lime containing magnesia. Instead of using lime as the starting material I may use, in a similar aqueous suspension, the pigment calcium carbonate magnesium hydroxide, such for example as is produced in conjunction with sodium hydroxide, i. e. an alkali metal hydroxide, from lime containing magnesia and sodium carbonate, i. e. an alkali metal carbonate, by the process described in my prior Patent No. 1,415,391, of May 9, 1922. This material when made from dolomitic lime has a residue on ignition of approximately 61 to 62%. It is converted by my present process into a calcium carbonate magnesium basic carbonate having substantially the same crystalline structure and substantially the same residue on ignition, namely approximately 50 to 51%, as has the material produced when dolomitic lime itself is used as the starting material.

When used with calcium carbonate magnesium hydroxide as the starting material, my process has the great advantage of adding at very little expense approximately 20 to 22% in weight to the pigment produced by my prior process (U. S. Patent No. 1,415,391), so that the cost per ton of the carbonated material so produced is usually less than the cost per ton of the original calcium carbonate magnesium hydroxide produced. If instead of using classified, screened or ultra screened calcium carbonate magnesium hydroxide as the starting material, the classifying, screening and/or ultra screening operation which would ordinarily be conducted during the production of the calcium carbonate magnesium hydroxide be deferred until subsequent to the carbonation process, the yield may be still further proportionately increased as explained above by the fact that during the carbonation process some of the particles which would otherwise be removed as oversize are reduced to usuable size.

The above adaptation of my process, (i. e. the use of calcium carbonate magnesium hydroxide as starting material) is particularly advantageous in cases where it is desired to produce a greater amount of pigment in proportion to sodium hydroxide, than is produced in the case where calcium carbonate magnesium hydroxide and sodium hydroxide are jointly produed. The present process as indicated above provides an increase of approximately 20 to 22% in pigment production without any corresponding increase in sodium hydroxide production.

If a still larger proportion of pigment to sodium hydroxide produced be desired than will be produced by my carbonation process utilized as indicated immediately above, such a larger proportion of pigment may be produced by utilizing, in the process for the production of calcium carbonate magnesium hydroxide (U. S. Patent No. 1,415,391), lime, containing magnesium, in excess of that amount which would ordinarily be employed to produce a given amount of sodium hydroxide, i. e. lime in excess of that which under the conditions of the reaction will have its calcium content substantially completely converted into calcium carbonate. That process will then be conducted in such a manner that the final reaction product will not be substantially all calcium carbonate magnesium hydroxide but rather calcium carbonate magnesium hydroxide containing calcium hydroxide magnesium hydroxide, i. e. part of the original slaked lime used in the process which may be described as an alkaline compound of an alkaline earth metal. This reaction product is then subjected to carbonization by carbon dioxide, preferably by the above described process. The free lime present reacts exactly as when lime alone is used as the starting material for my process as described originally herein, the calcium content being first carbonated to calcium carbonate, the lime thus being converted into calcium carbonate magnesium hydroxide. If it be desired merely to produce as the final reaction product calcium carbonate magnesium hydroxide, the process may be stopped at this point, there having been produced the calcium carbonate magnesium hydroxide formed in the original reaction in addition to that produced by the carbonation of the calcium content of the excess lime containing magnesia which passed through the causticizing process substantially unchanged. If it be desired to stop at this point, this point can readily be determined chemically by the disappearance from the solid reaction product at such point of water extractible calcium hydroxide. However, if the product desired be calcium carbonate magnesium basic carbonate, the carbonation is continued and the calcium carbonate magnesium hydroxide reacts as described directly above wherein the carbonation by the present process of calcium carbonate magnesium hydroxide (produced according to U. S. Patent No. 1,415,391) is described. The resulting product is calcium carbonate magnesium basic carbonate of the desired composition and microscopic particle shape indicated above.

The carrying out of the reaction disclosed in my prior Patent No. 1,415,391 with the use of an excess quantity of lime with subsequent carbonation of the solid reaction product, thus allows the production of a considerably increased proportion of pigment in relation to sodium hydroxide produced in said process, such an increased proportion being only limited by the available size of tanks and other equipment. Furthermore, an added advantage of this procedure is that the presence of free lime (usually in substantial amount) throughout the reaction results in a higher percentage conversion of sodium carbonate into sodium hydroxide than would be the case were all the calcium hydroxide present in the lime converted directly to calcium carbonate in the reaction. Of course the excess free lime may be present in any amount, but usually it is not worth while commercially to use less than 10% excess.

The commercial manufacture of calcium carbonate magnesium hydroxide by the reaction of a lime containing magnesia, for example dolomitic lime, and sodium carbonate is conveniently carried out in two stages in what is substantially a counter current manner. In the first stage an excess of lime is present, whereas in the second stage an excess of sodium carbonate is present. While the changed procedure proposed herein using excess lime and subsequent carbonation with carbon dioxide is preferably carried out by using originally an excess of lime larger than normal in the first stage of the process, it may also be carried out if desired by adding an excess of lime in the second stage of the process, or by adding lime to the finished material (calcium carbonate magnesium hydroxide) and subjecting the mixture to the carbonation process. In any case the lime should preferably be in well slaked condition when used.

A further modification of the process of manufacturing calcium carbonate magnesium hydroxide from lime containing magnesia, and sodium carbonate, and one which results in considerable simplification, may be practiced if excess lime be used in the process and subsequent carbonation with carbon dioxide be employed. The process according to this modification may be practiced as a one stage process, that is, the reaction between the sodium carbonate and the lime may take place only in one stage, corresponding roughly to the first stage of the process as now carried out in the two stage manner except that a larger excess of lime is preferably employed. The products resulting from this one stage reaction will be a solution of sodium hydroxide containing a very minor percentage of sodium carbonate, usually not more than 5 or 6% based on the total soda present, and solids comprising calcium carbonate magnesium hydroxide containing free lime (i. e. calcium hydroxide magnesium hydroxide). If the solution be separated from the solids by suitable means such as filterpressing and these solids be washed thoroughly in order to free them from the adhering soda salts, these solids, i. e. calcium carbonate magnesium hydroxide containing free lime, may be passed directly to the carbonation process for conversion to calcium carbonate magnesium hydroxide or calcium carbonate magnesium basic carbonate as desired. The washings may suitably be combined with the originally produced sodium hydroxide solution. As will be apparent this is a great simplification of the operation as previously carried out, requiring as it does for causticizing only one half of the apparatus formerly required to conduct the operation in two stages, and thus will lead to a greatly decreased cost of operation. It is made possible of course by the carbonation process which carbonates the calcium content of the excess free lime, which would have been formerly accomplished by treatment with sodium carbonate in the second stage of the process. If desired the calcium carbonate magnesium hydroxide containing free lime need not necessarily be washed substantially free from soda compounds prior to carbonation (although that is the preferred procedure), as the washing for the recovery of soda salts may take place on the finished carbonated material.

For certain uses it has been found desirable to have associated with the calcium carbonate magnesium hydroxide or the calcium carbonate magnesium basic carbonate, whichever be produced, a small amount, for example, one percent more or less, of a soluble alkaline salt such as sodium carbonate. Thus it is at times desirable to so conduct the process as to permit this amount of soda to be present in the carbonated product. This may be accomplished, as will be apparent, either by regulating the washing of the final material or by omitting this washing, or by actual addition of soda salt to the material. It will also be understood that if the carbonation product be made directly from lime containing magnesia as the raw material, the same result may be accomplished by direct addition of soda salt in the process or to the product.

It will be apparent that if, in any of the adaptations of the carbonation procedure herein described, impure carbon dioxide gas be employed, such for example as carbon dioxide containing sulphur dioxide, this will result in introducing a certain amount of impurity into the final reaction product. Ordinarily if the amount of impurity be small, it has little effect from a practical standpoint on the quality of the material produced; but it may be readily avoided if desired, for example, by suitably purifying the gas used, as set out previously above.

Having produced my desired calcium carbonate magnesium basic carbonate by any of the several modifications of my general method outlined above, I may now use the material in the manufacture of paper, either as a filler in the manufacture of filled paper, or as a coating pigment in the manufacture of coated paper.

In the manufacture of one modification of my paper, namely filled paper, I may mix the fibrous constituent or constituents with my material suitably in a beating engine, subject the same to the usual mechanical treatment therein and if desired to subsequent treatment in a refining engine such for example as a Jordan, then after suitable dilution pass the mix on to a web-forming device, dry the web, and finish it in the customary manner.

I may use any amount of my material in proportion to the fibre as desired, but inasmuch as my material is particularly well fitted for use in highly filled sheets, I prefer to use an amount which will give a filler content in the resulting sheet of approximately 25–30%. If suitable white water recovery systems are employed, the actual proportion of filler to fibre furnished in the beater need not be much greater than that in the final paper, as substantially all the filler is recovered under such conditions, but if such systems are not employed, it is of course necessary to use sufficient extra filler to make up for the losses in the white waters.

In the manufacture of either substantially unsized or sized paper containing my filler, there may be employed if desired any or all of the processes disclosed in my numerous issued patents or copending applications on the use of alkaline fillers in papermaking, particularly those having to do with the addition of materials to the paper mix under conditions favoring the minimizing of the time and/or intimacy of contact of the constituents of the mix, or with the application of material to the paper web itself, and cross reference is hereby made to said patents and applications, a number of which are specifically mentioned below.

If it be desired to make unsized paper with my filler, no other material but the fibrous material and the filler need be employed, but usually it is highly desirable also to employ acidic material such as alum preferably at the dilute stage as disclosed in my U. S. Patent No. 1,803,646, issued May 5, 1931. Moreover it is at times very desirable to employ starch, cross reference being made in this connection to my U. S. Patent No. 1,831,928, issued November 17, 1931. Furthermore the filler need not be added in the beater, but it may—and this is the procedure which is usually preferable—be added later on in the process, e. g. at the dilute stage of the papermaking operation, in accordance with the procedure disclosed in my U. S. Patent No. 1,808,070, issued June 2, 1931.

If sized paper is to be made, suitable sizing agents such as rosin, paraffin or the like, suitably applied, may be employed for imparting water resistance to the sheet. Such suitable sizes and methods are disclosed in numerous of my issued patents and copending applications, for example, Patents Nos. 1,803,643, 1,803,645, 1,803,647, 1,803,648, 1,803,650, 1,803,651, and 1,803,652, all issued May 5, 1931; and applications Serial No. 501,674, filed December 11, 1930, and Serial No. 534,461, filed May 1, 1931.

The filled paper produced with my filler is distinctly superior in quality to that produced with calcium carbonate magnesium basic carbonate produced by the carbonation of lime containing magnesia according to the process described in my prior Patent No. 1,595,416. It is more opaque, more uniform, has better printing qualities, possesses a better finish, and is more easily finished on the calenders. This as will be apparent represents a substantial advance in the art.

In the manufacture of another modification of my paper, namely coated paper, I may mix with my material an adhesive or mixture of adhesives, and apply the same to the surface or surfaces of a paper "body stock" by the use of any suitable paper coating machine. Any of the customary adhesives, such as starch, casein or the like may be used. As will be understood, other organic materials and/or inorganic materials, such as may be used in the manufacture of coated paper may be additionally incorporated in the mix if desired prior to the application of the mix to the body stock. The coated paper may then be dried and finished as usual.

I have found that my material, when produced from dolomitic lime, yields a filter press cake of approximately 37 to 40% solid content, according to the vacuum or pressure employed on the filter press used. Furthermore I have found that the material appears to require a definitely larger percentage of adhesive for the production of a coating of satisfactory strength than does my former calcium carbonate magnesium basic carbonate, requiring in certain cases, with casein for example, in the neighborhood of 35% air dry casein based on the weight of dry pigment. It will be apparent that when using a pigment which is not dewatered to any greater extent than the above for coating the ordinary grades of book and magazine coated papers which require a fairly heavy coating, due care should be taken, if the adhesive be dissolved prior to admixture with the pigment, that the adhesive be made up as a fairly concentrated solution, so as to produce a final mix of suitable concentration. For example, 1 part of casein in 4 parts by weight total casein solution will be a satisfactory concentration of adhesive to employ.

I have found when my pigment is the only pigment employed in a coating mix with an adhesive such as casein, that the mix has a tendency in certain cases to be somewhat difficult to spread and to brush mark when it is used on a brush coating machine.

I have found, however, that by the use of the process disclosed in my copending application Serial No. 428,231, filed February 13, 1930, namely, the addition of a small amount of acidic material such as alum to the material prior to blending it with the casein solution, that I have been able to reduce the viscosity of the resulting mix and substantially overcome the tendency to spread poorly and brush mark. Approximately one percent of alum based on the dry weight of the pigment is usually a satisfactory amount to employ.

When my pigment is used alone as the only pigment in a coating, it imparts an excellent degree of finish to the sheet. In certain cases this does not seem to be so high a finish as is imparted by satin white, but it is substantially higher than the finish imparted by the calcium carbonate magnesium basic carbonate made by carbonating dolomitic lime according to the process outlined in my above mentioned Patent No. 1,595,416, and also higher than the finish imparted by the use of the pigment calcium carbonate magnesium hydroxide disclosed in my Patent No. 1,415,391.

I have found that my pigment may be used as the only pigment in a coating mix, or that it may be employed in connection with other pigments ordinarily used in coating, such for example as clay, satin white, blanc fixe, calcium carbonate magnesium hydroxide or the like. It may be employed with any of the customary adhesives such as casein, modified starches and the like. Also the usual other ingredients of a mix such as coloring matter, antifroth oils and the like may be employed.

I have found that when my pigment is used in a coating mix with other pigment such as clay, any tendency toward brush marking is greatly minimized if not substantially eliminated. I have also found that in certain instances under such conditions there seems to be a reduction in the adhesive requirements of my pigment, so that it thus becomes desirable in certain cases to employ my material in conjunction with other pigment in the coating mix, apart from any consideration of the additive qualities which the several pigments may impart to such mix.

I have found that the paper coated with my material has not only, as stated above, a substantially higher finish than paper coated with the calcium carbonate magnesium basic carbonate produced as described in my Patent No. 1,595,416, but that the coated paper appears whiter in color than the paper coated with my former material, finishes more easily, has better printing qualities, and is more opaque. These improved characteristics, as will be well understood, are very desirable in a coated paper, and represent a distinct improvement in quality over the paper formerly produced.

It is of course possible to employ paper filled with my material as the body stock for paper coated with my material; but it is to be understood that paper filled with my material may if desired be coated with other material; whereas any suitable paper other than that filled with my material may if desired be employed as body stock to which to apply my coating material.

When I speak of carrying out a reaction within a given temperature range, I mean to include within that range the temperatures mentioned as the limits of the range.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

The words "coated paper" in this specification are to be understood as referring to the coated product produced by coating any type of paper coming under the definition of "paper" given above.

Where I use the term "alkaline earth metal", I intend it to include magnesium.

While I have described in detail the preferred embodiments of my invention, it is to be understood that the details of procedure, the proportions of ingredients, and the arrangement of steps may be widely varied without departing from the spirit of my invention or the scope of the subjoined claims.

I claim:

1. In the method of manufacturing pigment wherein an alkali metal carbonate is causticized with a lime containing magnesia in the presence of water, the improvement for producing pigment in excess of the amount producible in said causticizing reaction with a given amount of alkali metal carbonate which comprises mixing lime containing magnesia in the presence of water with an amount of alkali metal carbonate insufficient under the conditions of the reaction completely to carbonate the calcium content of said lime, substantially separating the solution of the causticized alkali metal salt from the solid reaction product, and then subjecting said product in the presence of water to the action of carbon dioxide at a temperature approximately between 60° C. and that of boiling, thereby maintaining substantially all the magnesium content of said product in substantially water insoluble form while continuing the addition of said carbon dioxide, until calcium carbonate magnesium basic carbonate is produced from said product.

2. In the method of manufacturing pigment wherein an alkali metal carbonate is causticized with a lime containing magnesia in the presence of water, the improvement for producing pigment in excess of the amount producible in said causticizing reaction with a given amount of alkali metal carbonate which comprises mixing slaked lime containing magnesia in the presence of water with an amount of alkali metal carbonate insufficient under the conditions of the reaction completely to carbonate the calcium content of said lime, substantially separating the solution of the causticized alkali metal salt from the solid reaction product, and then subjecting said product in the presence of water to the action of carbon dioxide at a temperature approximately between 60° C. and that of boiling, thereby maintaining substantially all the magnesium content of said product in substantially water insoluble form while continuing the addition of said carbon dioxide, until calcium carbonate magnesium basic carbonate is produced from said product.

3. In the method of manufacturing pigment wherein an alkali metal carbonate is causticized with a lime containing magnesia in the presence of water, the improvement for producing pigment in excess of the amount producible in said causticizing reaction with a given amount of alkali metal carbonate which comprises mixing lime containing magnesia in the presence of water with an amount of alkali metal carbonate insufficient under the conditions of the reaction completely to carbonate the calcium content of said lime, substantially separating the solution of the causticized alkali metal salt from the solid reaction product, and then subjecting said product in the presence of water to the action of carbon dioxide at a temperature approximately between 80° C. and that of boiling, thereby maintaining substantially all the magnesium content of said product in substantially water insoluble form while continuing the addition of said carbon dioxide, until calcium carbonate magnesium basic carbonate is produced from said product.

4. In the method of manufacturing pigment wherein an alkali metal carbonate is causticized with a lime containing magnesia in the presence of water, the improvement for producing pigment in excess of the amount producible in said causticizing reaction with a given amount of alkali metal carbonate which comprises mixing slaked lime containing magnesia in the presence of water with an amount of alkali metal carbonate insufficient under the conditions of the reaction completely to carbonate the calcium content of said lime, substantially separating the solution of the causticized alkali metal salt from the solid reaction product, and then subjecting said product in the presence of water to the action of carbon dioxide at a temperature approximately between 80° C. and that of boiling, thereby maintaining substantially all the magnesium content of said product in substantially water insoluble form while continuing the addition of said carbon dioxide, until calcium carbonate magnesium basic carbonate is produced from said product.

HAROLD ROBERT RAFTON.